March 21, 1967 F. J. VOOS 3,310,064
VALVE CORE
Filed Jan. 22, 1964
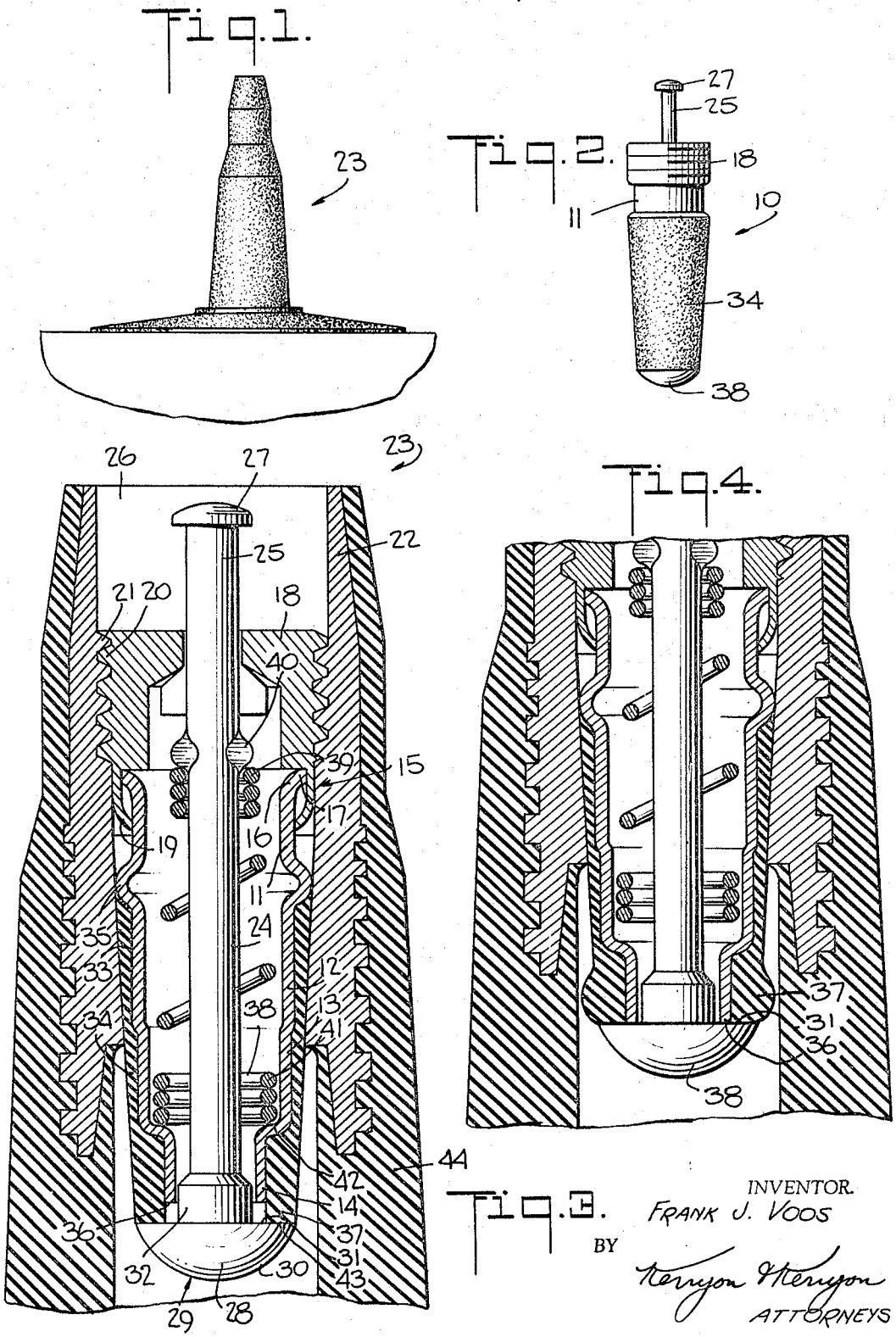
INVENTOR.
FRANK J. VOOS
BY
Kenyon & Kenyon
ATTORNEYS

United States Patent Office 3,310,064
Patented Mar. 21, 1967

3,310,064
VALVE CORE
Frank J. Voos, Stratford, Conn., assignor to National Distillers and Chemical Corporation, Richmond, Va., a corporation of Virginia
Filed Jan. 22, 1964, Ser. No. 339,518
4 Claims. (Cl. 137—234.5)

This invention relates to valve cores and more particularly to a new design of valve core for high pressure service.

Prior valve core structures involve various types of sealing elements, some involving metal to metal sealing surfaces and others metal to rubber sealing surfaces, the latter structures including those having tapered stems sealing against rubber skirts and rubber cup washers sealing against the edge of a metal barrel as well as other arrangements. All of the prior art structures including those just described have one or more disadvantages when used in connection with high pressures and even at medium and low pressures. For example, the core having the tapered valve seat and rubber skirt occasionally involves rubber to rubber contacting surfaces, i.e. the rubber skirt against the rubber portion of the valve stem. This occasions sticking of the skirt core stem after prolonged service under incidental heat and pressure with consequent decrease in sealing pressure and difficulty in replacement of the core. Other types involving rubber cup washers and radially disposed rubber flanges frequently involve displacement of the rubber due to fluid pressure with consequent decrease or complete loss of sealing ability of the core.

The present invention has as an object the provision of a valve core which can be used at high pressures and having metal to rubber sealing surfaces which avoid any tendency of the rubber to be sucked out or displaced and further includes a metal to metal maximum pressure limit stop for the stem. Other objects include the provision of a core having a shorter overall length, and having a simplified method of manufacture with less expense involved than with prior cores.

Briefly the present invention comprises a tubular barrel having an axially extending annular lip portion at one end and a screw plug member at the other end adapted to mate for example with the internal threads of a tire valve stem. A rubber sleeve is disposed on the barrel and has an axial portion adapted to seal the core within the entire valve stem and includes an end portion extending beyond the end of the lip portion. The sleeve has an inner diameter substantially the same as the outer diameter of the lip portion. A spring biased valve pin is disposed axially in the barrel and has an enlarged sealing head disposed externally of the lip end of the barrel with a substantially flat, annular sealing face thereon movable against the bottom edge of the end portion of the sleeve in resilient sealing relationship. The end portion of the sleeve is laterally yieldable under pneumatic pressure to a point at which the sealing face of the pin engages the end of the lip portion. The valve pin has an enlarged cylindrical portion adjacent the head movable in said annular lip portion in relatively close relation therewith during sealing engagement of the head with said end portion and being removable therefrom after the head is disengaged from said end portion.

Other objects and features of the invention become apparent in the following specification and claims and in the drawings in which:

FIG. 1 is an elevation of a standard valve stem;

FIG. 2 is an enlarged elevation of a valve core constructed in accordance with the invention;

FIG. 3 is an enlarged elevation in partial section of an assembly including the stem and core; and FIG. 4 is an enlarged fragmentary elevation in partial section of the structure shown in FIG. 3.

Referring now to the drawings a valve core constructed according to the principles of the present invention is shown and designated generally by reference numeral 10. It is comprised of a tubular metal barrel 11 having a succession of cylindrical portions 12, 13 and 14 of diminishing radii providing a stepped configuration. The cylindrical portion 14 at the lower end of the barrel as viewed in FIG. 3 provides an axially extending annular lip portion at the sealing end of the barrel 11. At the upper end 15 of the barrel 11 is an outwardly flared member 16 which engages the inner end portion 17 of screw plug 18 which is secured thereto by inwardly turned member 19. Screw plug 18 has the usual outer threaded section 20 for engagement with corresponding threads 21 in the metal portion 22 of the valve stem 23. Slideably disposed in barrel 11 is axially extending pin 24 having upper exposed end 25 extending beyond screw plug 18 into the upper end portion 26 of the valve stem 23. The pin 24 has an enlarged end or button 27 at its upper end 25 and an enlarged sealing head 28 at the bottom end 29. Said sealing head 28 has a curved or hemispherical bottom contour 30 and a flat annular sealing surface 31 on its upper face. The pin 24 has a cylindrical member 32 of enlarged radius immediately adjacent sealing head 28 which is adapted for movement within lip portion 14 of barrel 11 in relatively close relation therewith and will be described in more detail hereafter.

Disposed along the outer surface 33 of barrel 11 is sleeve 34 of rubber or other elastomeric material which extends from annular bulge 35 on barrel 11 to a point beyond the bottom edge 36 of the barrel providing a resilient sealing end portion or skirt 37. Sleeve 34 may be molded on the barrel or fabricated separately and then slipped thereon and bonded to the metal barrel 11 in any well known manner. Spring means 38 is disposed in barrel 11 and axially receives pin 24. Upper end 39 of the spring 38 bears against the annular protuberance 40 on pin 24 and the lower end 41 of spring 38 bears against shoulder 42 of barrel 11 at the junction of cylindrical sections 13, 14 of the barrel. Thus pin 24 is biased upwardly as viewed in FIG. 3 to bring the flat annular face 31 of sealing head 28 against the bottom end edge 43 of rubber skirt 37. The sealing face 31 is thereby biased generally perpendicular to the rubber sleeve 34 and at or about the point of contact the cylindrical enlargement 32 of the pin 24 extends into lip portion 14 for approximately half of the length of the enlargement. This provides lateral stability for pin 24 and guards against any tendency for rubber to move laterally and axially into lip portion 14.

As shown in FIG. 4, rubber skirt 37 is movable laterally outwardly under extreme pressure on sealing head 38 to a position at which bottom edge 36 of lip portion 14 engages the sealing face 31 of sealing head 38 to provide a maximum pressure limit stop for the valve core.

It is to be noted that at no point does rubber sleeve 34 come into contact with the rubber 44 of stem 23.

The metal parts of valve core 10 are fabricated of any of the conventional metals as desired and any elastomeric material may be used for the sleeve 34 which has the desired resiliency and aging characteristics.

The valve core of the present invention is capable of use at high pressures, i.e. 900–2500 p.s.i., at medium pressures, i.e. 200–900 p.s.i., as well as at low pressures of i.e. 0–200 p.si. The valve has particular utility in such special applications as the high pressure side of carbon dioxide cylinder pressure regulators, for diving equipment and also as the regulator valve core in beverage dispensers, et cetera. It is able to withstand high temperatures, e.g. 450° F. It has eliminated the problem found in valve cores having a cup washer, namely leakage along the valve pin. The latter condition has been avoided since there is no cup washer. With rubber on the barrel there is provided mechanical stability of the rubber seal because mechanical force is applied to it by the static seal between the barrel and the outer stem.

It can thus be seen that the present invention provides a new and novel valve core eliminating undesirable characteristics of the prior art devices. It is to be understood that those skilled in the art may make changes and additions in the present device without departing from the scope and spirit of the invention.

I claim:

1. A pneumatic tire valve core comprising a tubular barrel having an axially extending annular lip portion at one end thereof and a screw plug member at the other end thereof adapted to mate with the internal threads of a tire valve stem, an elastomeric sleeve disposed on said barrel and having an axial portion thereof adapted to seal said core within the tire valve stem and an end portion thereof extending beyond the end of said lip portion and spaced radially inwardly from the wall of said stem, a spring biased valve pin disposed axially in said barrel having an enlarged sealing head disposed externally of the lip end thereof with a substantially flat annular sealing face thereon movable against the bottom edge of said end portion in resilient sealing relationship, said end portion of said sleeve and said sleeve remains spaced from the wall of said stem laterally yieldable under pneumatic pressure to a point at which said sealing face engages the end of said lip portion.

2. A pneumatic tire valve core comprising a tubular barrel having an axially extending annular lip portion at one end thereof and a screw plug member at the other end thereof adapted to mate with the internal threads of a tire valve stem, an elastomeric sleeve disposed on said barrel and having an axial portion thereof adapted to seal said core within the tire valve stem and an end portion thereof extending beyond the end of said lip portion and having an inner diameter substantially the same as the outer diameter of said lip portion, said sleeve being spaced radially inwardly from the wall of said stem, a spring biased valve pin disposed axially in said barrel having an enlarged sealing head disposed externally of the lip end thereof with a substantially flat annular sealing face thereon movable against the bottom edge of said end portion in resilient sealing relationship, said end portion of said sleeve and said sleeve remains spaced from the wall of said stem laterally yieldable under pneumatic pressure to a point at which said sealing face engages the end of said lip portion.

3. A pneumatic tire valve core comprising a tubular barrel having an axially extending annular lip portion at one end thereof and a screw plug member at the other end thereof adapted to mate with the internal threads of a tire valve stem, an elastomeric sleeve disposed on said barrel and having an axial portion thereof adapted to seal said core within the tire valve stem and an end portion thereof extending beyond the end of said lip portion and having an inner diameter substantially the same as the outer diameter of said lip portion, a spring biased valve pin disposed axially in said barrel having an enlarged sealing head disposed externally of the lip end thereof with a substantially flat annular sealing face thereon movable against the bottom edge of said end portion in resilient sealing relationship, said end portion of said sleeve laterally yieldable under pneumatic pressure to a point at which said sealing face engages the end of said lip portion, said valve pin having an enlarged diameter portion adjacent said head dimensioned axially so as to be movable in said annular lip portion in relatively close relation therewith during sealing engagement of said head with said end portion and being removable therefrom after said head is dis-engaged from said end portion.

4. A pneumatic tire valve core comprising a tubular barrel having an axially extending annular lip portion at one end thereof and a screw plug member at the other end thereof adapted to mate with the internal threads of a tire valve stem, a rubber sleeve disposed on said barrel and having an axial portion thereof adapted to seal said core within the tire valve stem and an end portion thereof extending beyond the end of said lip portion and having an inner diameter substantially the same as the outer diameter of said lip portion, a spring biased valve pin disposed axially in said barrel having an enlarged sealing head disposed externally of the lip end thereof with a substantially flat annular sealing face thereon movable against the bottom edge of said end portion in resilient sealing relationship, said end portion of said sleeve laterally yieldable under pneumatic pressure to a point at which said sealing face engages the end of said lip portion, said valve pin having an enlarged diameter portion adjacent said head dimensioned axially so as to be movable in said annular lip portion in relatively close relation therewith during sealing engagement of said head with said end portion and being removable therefrom after said head is disengaged from said end portion.

References Cited by the Examiner

UNITED STATES PATENTS

| 2,188,713 | 1/1940 | Gora | 137—223 |
| 2,223,509 | 12/1940 | Brauer | 251—332 X |
| 2,524,951 | 10/1950 | Ashton | 251—332 X |
| 2,847,182 | 8/1958 | Mancusi | 251—332 |
| 3,000,390 | 9/1961 | Hosking | 137—234.5 |

FOREIGN PATENTS 191,277   8/1957   Austria.

WILLIAM F. O'DEA, *Primary Examiner.*

ISADOR WEIL, *Examiner.*

D. LAMBERT, *Assistant Examiner.*